United States Patent
Lee et al.

(10) Patent No.: US 9,496,635 B2
(45) Date of Patent: Nov. 15, 2016

(54) MEMORY CARD INDENTIFICATION DEVICE, HOST DEVICE AND MEMORY CARD USING THE SAME

(71) Applicant: SAMSUNG ELECTRONICS CO., LTD., Suwon-si (KR)

(72) Inventors: Jae-bum Lee, Yongin-si (KR); Seok-heon Lee, Suwon-si (KR); Sung-hoon Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/644,673

(22) Filed: Mar. 11, 2015

(65) Prior Publication Data

US 2015/0380844 A1 Dec. 31, 2015

(30) Foreign Application Priority Data

Jun. 26, 2014 (KR) ........................ 10-2014-0079119

(51) Int. Cl.
*H01R 12/00* (2006.01)
*H01R 12/70* (2011.01)
*G06K 7/04* (2006.01)

(52) U.S. Cl.
CPC ............. *H01R 12/7094* (2013.01); *G06K 7/04* (2013.01)

(58) Field of Classification Search
CPC .... H01R 12/7094; H01R 27/00; G06K 7/04; G06K 7/0043; G06F 13/385; G06F 13/38
USPC .......................................................... 439/70
See application file for complete search history.

(56) References Cited

U.S. PATENT DOCUMENTS

| | | | |
|---|---|---|---|
| 6,612,498 B1 | 9/2003 | Lipponen et al. | |
| 6,663,007 B1 | 12/2003 | Sun et al. | |
| 6,783,399 B2 * | 8/2004 | Joung | G06K 7/0043 361/737 |
| 6,830,474 B2 | 12/2004 | Liu et al. | |
| 7,364,468 B2 | 4/2008 | Liu et al. | |
| 7,493,437 B1 * | 2/2009 | Jones | G06F 13/38 710/301 |
| 7,896,671 B2 | 3/2011 | Kim et al. | |
| 8,337,252 B2 * | 12/2012 | Mambakkam | H01R 27/00 439/630 |
| 2003/0095386 A1 * | 5/2003 | Le | G06K 19/07741 361/737 |
| 2009/0100207 A1 * | 4/2009 | Jones | G06F 13/385 710/301 |
| 2013/0224982 A1 | 8/2013 | Joo | |
| 2013/0288535 A1 | 10/2013 | You et al. | |

FOREIGN PATENT DOCUMENTS

| | | |
|---|---|---|
| JP | 3640343 B2 | 4/2005 |
| JP | 2009-252109 A | 10/2009 |
| JP | 2010-020482 A | 1/2010 |
| KR | 10-2003-0053160 A | 6/2003 |
| KR | 10-2004-0017640 A | 2/2004 |
| KR | 10-2007-0071674 A | 7/2007 |
| KR | 10-2008-0106728 A | 12/2008 |
| KR | 10-2012-0055553 A | 5/2012 |

\* cited by examiner

*Primary Examiner* — Jean F Duverne
(74) *Attorney, Agent, or Firm* — Sughrue Mion, PLLC

(57) ABSTRACT

A memory card identification device, a host device using the memory card, and a memory card are provided. The memory card identification device includes: a card socket comprising a single card slot through which at least two kinds of memory cards can be inserted and a target port disposed to be in contact with any one kind of a target memory card based on an external characteristic difference between different kinds of memory cards; and a card type detector configured to determine a type of a memory card inserted in the card socket by using a contact state signal of the target port.

18 Claims, 19 Drawing Sheets

MEMORY CARD INDENTIFICATION DEVICE, HOST DEVICE AND MEMORY CARD USING THE SAME

CROSS-REFERENCE TO RELATED APPLICATIONS

This application claims the benefit of Korean Patent Application No. 10-2014-0079119, filed on Jun. 26, 2014, in the Korean Intellectual Property Office, the disclosure of which is incorporated herein in its entirety by reference.

BACKGROUND

Apparatuses and methods consistent with exemplary embodiments relate to a device for and a method of identifying different types of memory cards, and more particularly, to a memory card identification device, a host device and a memory card using the memory card identification device.

Memory cards are used for high capacity data storage in a host device, such as a personal computer, a mobile phone, a personal digital assistant (PDA), a digital camera, or a portable audio player. There are various standards for memory cards, and new standards have gradually been suggested. Generally, in a host device designed to use a memory card made according to one standard, a memory card of another standard cannot be used. Accordingly, it is necessary to develop a product that can use memory cards of different standards in a host device.

SUMMARY

One or more exemplary embodiments may provide a memory card identification device for identifying different types of memory cards by using a card socket having a single card slot.

One or more exemplary embodiments may also provide a host device in which different kinds of memory cards may be used through a single card slot.

One or more exemplary embodiments may also provide a memory card that may be used in a host device supporting different kinds of memory cards through a single card slot.

According to an aspect of an exemplary embodiment, there is provided a memory card identification device, the memory card identification device including: a card socket comprising a single card slot through which at least two kinds of memory cards can be inserted and a target port disposed to be in contact with any one kind of a target memory card based on an external characteristic difference between the at least two kinds of memory cards; and a card type detector configured to determine a type of a memory card inserted in the card socket by using a contact state signal of the target port.

The target port may include an electrical switch which may be turned on or turned off according to an outer shape of a memory card inserted in the card socket.

The electrical switch in the target port may generate a signal indicating a first logic state in response to insertion of the target memory card in the card socket, and a signal indicating a second logic state in response to insertion of a memory card other than the target memory card in the card socket.

The target port may be allocated as a port for supplying a power supply voltage of the target memory card.

The target port may be disposed in a position where the target port does not contact patterns disposed in a memory card other than the target memory card of the at least two kinds of memory cards.

The card type detector may determine the type of the memory card inserted in the card socket based on a turn-on state or turn-off state of the electrical switch formed in the target port.

The card type detector may determine the memory card inserted in the card socket as a first type in response to detection of a turn-on signal from the electrical switch, and may determine the memory card inserted in the card socket as a second type in response to detection of a turn-off signal from the electrical switch.

The card type detector may determine the type of the memory card inserted in the card socket according to an initialization process using a first power supply voltage that is applied to the target port or an initialization process using a second power supply voltage that is applied to any one port other than the target port from among ports disposed in the card socket.

The card type detector may determine the memory card inserted in the card socket as a first type in response to a determination that an initialization process corresponding to a card standard of the first type is successfully performed based on a first power supply voltage in a period in which the first power supply voltage is supplied to the target port.

If the initialization process corresponding to the card standard of the first type fails, the card type detector may determine the memory card inserted in the card socket as a second type in response to a determination that an initialization process corresponding to a card standard of the second type is successfully performed based on a second power supply voltage in a period in which the second power supply voltage is supplied to a port disposed in the card socket other than the target port.

The card socket may further include a sensor configured to sense a state in which a memory card is inserted through the single card slot.

According to an aspect of another exemplary embodiment, there is provided a host device, the host device including: a card socket comprising a single card slot through which at least two kinds of memory cards can be inserted and a target port corresponding to any one kind of a target memory card that is disposed based on an external characteristic difference between different kinds of memory cards; and a host controller configured to determine a type of a memory card inserted in the card socket and to perform an initialization operation by using a state signal of the target port.

The host controller may perform a first initialization operation corresponding to a card standard of a first type after applying a first power supply voltage to the target port in a state in which a memory card is inserted in the card socket, and determine the memory card as the first type in response to a determination that the first initialization operation is successfully performed.

The host controller may perform, if the first initialization operation fails, a second initialization operation corresponding to a standard of a second type after applying a second power supply voltage to any one port other than the target port from among ports disposed in the card socket, and determine the memory card as the second type in response to a determination that the second initialization operation is successfully performed.

The card socket may further include a sensor configured to sense a state in which a memory card is inserted in the card socket through the single card slot, and the host controller may determine whether a memory card is inserted in the card socket, based on a sensing signal generated by the sensor.

The target port may be allocated as a port for supplying a power supply voltage of the one kind of target memory card and may be disposed in a position that does not overlap a position where ports corresponding to a memory card other than the target memory card from among the at least two kinds of memory cards are disposed.

The target port may include an electrical switch which is turned on or turned off according to an outer shape of a memory card inserted in the card socket, and the host controller may determine a type of the memory card inserted in the card socket based on a signal output from the electrical switch formed in the target port.

The host controller may store data in a memory card inserted in the card socket or read data from the memory card, based on an interface standard corresponding to the determined memory card type.

According to an aspect of another exemplary embodiment, there is provided a memory card that is applicable to a host device supporting different kinds of memory cards through a card socket including a single card slot, the memory card including: a printed circuit board (PCB) configured to dispose a first set of contact patterns for at least one signal in a first zone and to dispose a contact pattern for a power supply voltage in a second zone; and a memory device and a memory controller mounted on the PCB, the memory controller being configured to control the memory device based on a command and an address which are received from the host device through the contact patterns in the first and second zones, wherein a position of the contact pattern for the power supply voltage in the second zone is determined so as not to overlap with a position of electrical contact patterns disposed in a legacy memory card other than the memory card of different kinds of memory cards.

The contact pattern disposed in the second zone corresponds to a target port disposed in the card socket, and the target port is allocated as a port for supplying a power supply voltage of the memory controller of the memory card.

BRIEF DESCRIPTION OF THE DRAWINGS

Exemplary embodiments of the inventive concept will be more clearly understood from the following description, taken in conjunction with the accompanying drawings, in which.

DETAILED DESCRIPTION OF THE EXEMPLARY EMBODIMENTS

Figure 1:
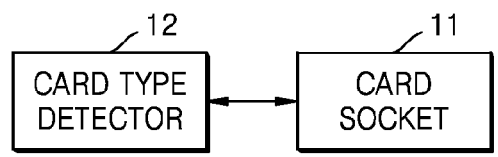
FIG. 1 is a block diagram of a memory card identification device according to an exemplary embodiment.

Hereinafter, exemplary embodiments will be described more fully with reference to the accompanying drawings, in which various exemplary embodiments are shown. The inventive concept may, however, be embodied in many different forms and should not be construed as being limited to the exemplary embodiments set forth herein; rather, these exemplary embodiments are provided so that this disclosure will be thorough and complete, and will fully convey the inventive concept to those of ordinary skill in the art. In the drawings, like reference numerals denote like elements, and the dimensions of structures may be exaggerated for clarity.

The terms used in the present disclosure are merely used to describe exemplary embodiments, and are not intended to limit the inventive concept. An expression used in the singular encompasses the expression of the plural, unless it has a clearly different meaning in the context. In the present disclosure, it is to be understood that the terms such as "including" or "having," etc., are intended to indicate the existence of the features, numbers, steps, actions, components, parts, or combinations thereof disclosed in the disclosure, and are not intended to preclude the possibility that one or more other features, numbers, steps, actions, components, parts, or combinations thereof may exist or may be added.

Unless otherwise defined, all terms (including technical and scientific terms) used herein have the same meaning as commonly understood by one of ordinary skill in the art to which the inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. As used herein, the term "and/or" includes any and all combinations of one or more of the associated listed items.

FIG. 1 is a block diagram of a memory card identification device 10 according to an exemplary embodiment.

Referring to FIG. 1, the memory card identification device 10 may include a card socket 11 and a card type detector 12.

The card socket 11 has a structure in which at least two kinds of memory cards may be inserted through a single card slot and has a structure in which a target port corresponding to any one kind of target memory card is disposed based on an external characteristic difference between different kinds of memory cards.

For example, a target port disposed in the card socket 11 may include an electrical switch. In detail, the card socket 11 may be designed so that an electrical switch formed in a target port is turned on or turned off according to an outer shape of a memory card inserted through a single card slot.

As another example, a target port disposed in the target socket 11 may be allocated as a port for supplying a power supply voltage of any one kind of target memory card.

As another example, the card socket 11 may include a sensor for detecting a state in which a memory card is inserted through a card slot. For example, the sensor may be configured to detect, by using a mechanical sensing scheme or an electrical sensing scheme, a state in which a memory card is inserted in the card socket 11.

The card type detector 12 may determine a type of a memory card, which is inserted in the card socket 11, by using a signal of a target port disposed in the card socket 11. The card type detector 12 may determine a type of a memory card after determining a state, in which the memory card is inserted in the card socket 11, by using the sensor disposed in the card socket 11.

For example, the card type detector 12 may determine a type of a memory card inserted in the card socket 11 based on a turn-on state or turn-off state of an electrical switch formed in the target port. In detail, the card type detector 12 may determine a memory card inserted in the card socket 11 as a first type when the electrical switch generates a signal indicating a turn-on state and may determine a memory card inserted in the card socket 11 as a second type when the electrical switch generates a signal indicating a turn-off state.

As another example, the card type detector 12 may determine a type of a memory card inserted in the card socket 11 according to an initialization process using a first power supply voltage that is applied to the target port of the card socket 11 or an initialization process using a second power supply voltage that is applied to any one port other than the target port from among ports disposed in the card socket 11. In detail, the card type detector 12 may determine a memory card inserted in the card socket 11 as a first type if an initialization process corresponding to a card standard of the first type is successfully performed based on the first power supply voltage in a period in which the first power supply voltage is supplied to the target port. The card type detector 12 may determine a memory card inserted in the card socket 11 as a second type if an initialization process corresponding to a card standard of the second type is successfully performed based on the second power supply voltage in a period in which the second power supply voltage is supplied to a port other than the target port from among ports disposed in the card socket.

Figure 2:
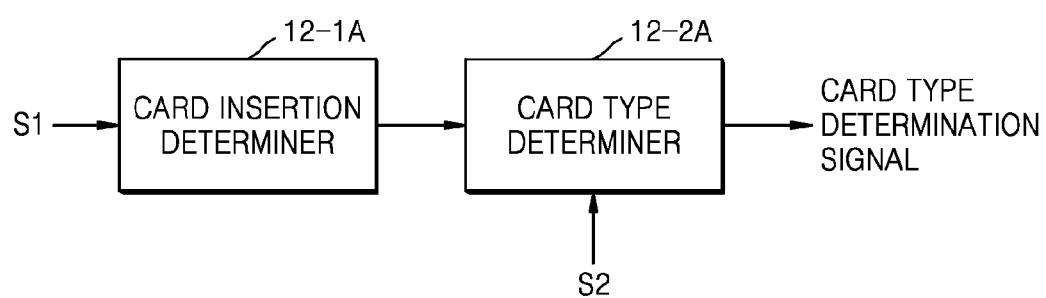
FIG. 2 is a block diagram of an example of a card type detector of FIG. 1.

FIG. 2 is a block diagram of an exemplary example of the card type detector 12 of FIG. 1.

A card type detector 12A illustrated in FIG. 2 may include a card insertion determiner 12-1A and a card type determiner 12-2A.

The card insertion determiner 12-1A may determine whether a memory card is inserted in the card socket 11, and output a signal corresponding to a determination result to the card type determiner 12-2A. For example, the card insertion determiner 12-1A may determine whether a memory card is inserted in the card socket 11 through a card slot, by using a signal S1 generated by the sensor of the card socket 11. The sensor of the card socket 11 will be described below.

When a memory card is inserted in the card socket 11, the card type determiner 12-2A may determine a type of the memory card inserted in the card socket 11.

For example, the card type determiner 12-2A may determine a type of a memory card inserted in the card socket 11 by using a signal S2 of the target port disposed in the card socket 11 when a signal indicating a state in which the memory card is inserted in the memory socket 11 is input from the card insertion determiner 12-1A. In detail, when a memory card of the first type is inserted in the card socket 11 based on an outer shape depending on a type of a memory card, the signal S2 that is output from an electrical switch formed in the target port of the card socket 11 indicates a first logic state. When a memory card of the second type is inserted in the card socket 11, the signal S2 indicates a second logic state. Accordingly, the card type determiner 12-2A may determine a memory card inserted in the card socket 11 as the first type when the signal S2 indicates the first logic state, may determine a memory card inserted in the card socket 11 as the second type when the signal S2 indicates the second logic state, and may generate a card type determination signal corresponding to a determination result.

Figure 3:
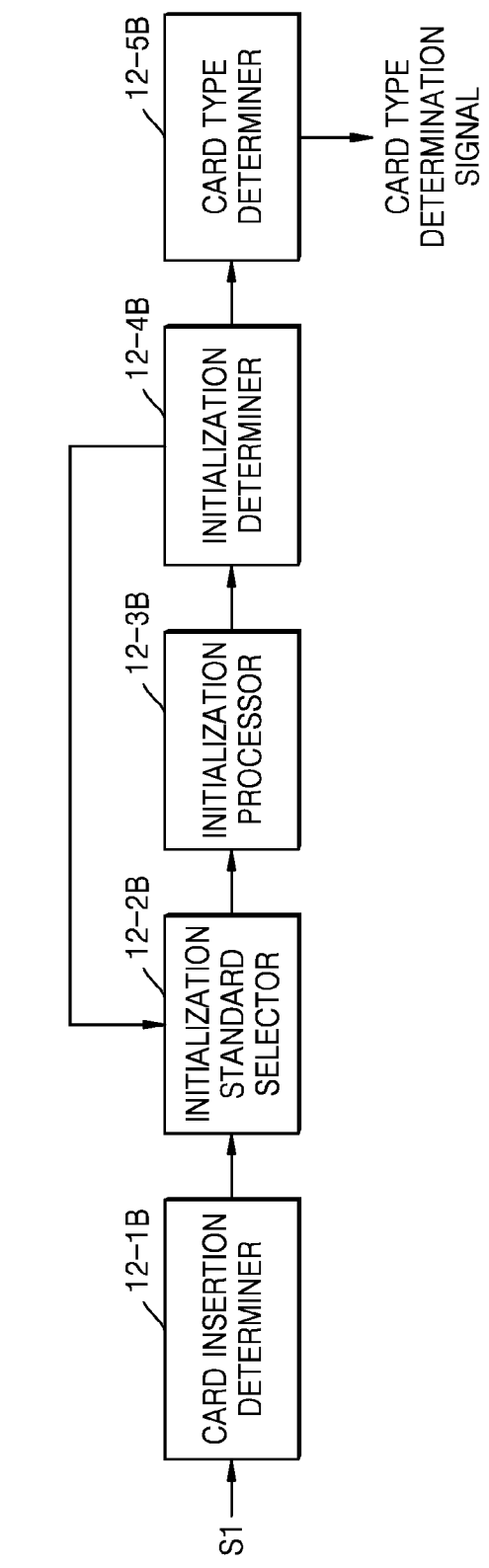
FIG. 3 is a block diagram of another example of a card type detector of FIG. 1.

FIG. 3 is a block diagram of another exemplary example of the card type detector 12 of FIG. 1.

A card type detector 12B illustrated in FIG. 3 may include a card insertion determiner 12-1B, an initialization standard selector 12-2B, an initialization processor 12-3B, an initialization determiner 12-4B, and a card type determiner 12-5B.

The card insertion determiner 12-1B illustrated in FIG. 3 is same as the card insertion determiner 12-1A illustrated in FIG. 2, and thus, repeated descriptions thereof are omitted.

The initialization standard selector 12-2B may select an initialization standard based on initialization determination information, which is input from the initialization determiner 12-4B, when a signal indicating a state in which a memory card is inserted in the card socket 11 is input from the card insertion determiner 12-1B. If the initialization determination information is not input from the initialization determiner 12-4B, the initialization standard selector 12-2B may select an initialization standard corresponding to a memory card of the first type, which is set as a default value. Accordingly, an initialization standard that is first selected after the signal indicating a state in which a memory card is inserted in the card socket 11 is input is the initialization standard corresponding to a memory card of the first type, which is set as the default value.

For example, the memory card of the first type may perform a first initialization process using the first power supply voltage which is applied to the target port of the card socket 11. The memory card of the second type may perform a second initialization process using the second power supply voltage which is applied to any one port other than the target port from among ports disposed in the card socket 11.

The initialization processor 12-3B performs an initialization process for a memory card inserted in the card socket 11 according to an initialization standard selected by the initialization standard selector 12-2B. Accordingly, when a memory card is inserted in the card socket 11, the initialization processor 12-3B performs an initialization operation according to a memory card standard of the first type, which is set as a default value. That is, when a memory card is inserted in the card socket 11, the initialization processor 12-3B performs a first initialization operation according to a memory card standard of the first type regardless of a type of the inserted memory card. For example, when a first type of initialization standard is selected, the first initialization process using the first power supply voltage that is applied to the target port of the card socket 11 is performed. When a second type of initialization standard is selected, the second initialization process using the second power supply voltage that is applied to any one port other than the target port from among ports disposed in the card socket 11 is performed.

The initialization determiner 12-4B may determine whether an initialization operation performed in the initialization processor 12-3B is successful, and output information about a determination result to the initialization standard selector 12-2B or the card type determiner 12-5B. For example, whether an initialization operation is successful may be determined by using information about an initialization operation result which is received from a memory card inserted in the card socket 11. That is, when the information indicating a success in the initialization operation is received, it may be determined that the initialization operation is successful. Otherwise, it may be determined that the initialization operation is failed.

For example, when the first initialization operation is successful, the initialization determiner 12-4B outputs information indicating the success to the card type determiner 12-5B. When the first initialization operation fails, the initialization determiner 12-4B outputs information indicating the failure to the initialization standard selector 12-2B and the card type determiner 12-5B. In addition, when the second initialization operation is successful or failed, the initialization determiner 12-4B outputs information indicating the success or failure to the card type determiner 12-5B.

When the information indicating the failure of the first initialization operation is input from the initialization determiner 12-4B, the initialization standard selector 12-2B selects an initialization standard corresponding a memory card of the second type. In this case, the initialization processor 12-3B performs the second initialization process for a memory card inserted in the card socket 11, selected by the initialization standard selector 12-2B. That is, when the first initialization operation fails, the initialization processor 12-3B performs the second initialization operation.

The card type determiner 12-5B may generate a card type determination signal based on information about initialization determination which is input from the initialization determiner 12-4B. For example, when information indicating the success of the first initialization operation is input, the card type determiner 12-5B generates a card type determination signal for determining a memory card inserted in the card socket 11 as a memory card of the first type. In addition, when information indicating the success of the second initialization operation is input, the card type determiner 12-5B generates a card type determination signal for determining a memory card inserted in the card socket 11 as a memory card of the second type. When information indicating the failure of the first initialization operation or information indicating the failure of the second initialization operation is input, the card type determiner 12-5B generates a card type determination signal indicating the failure in determining a type of a memory card inserted in the card socket 11.

Figure 4A:
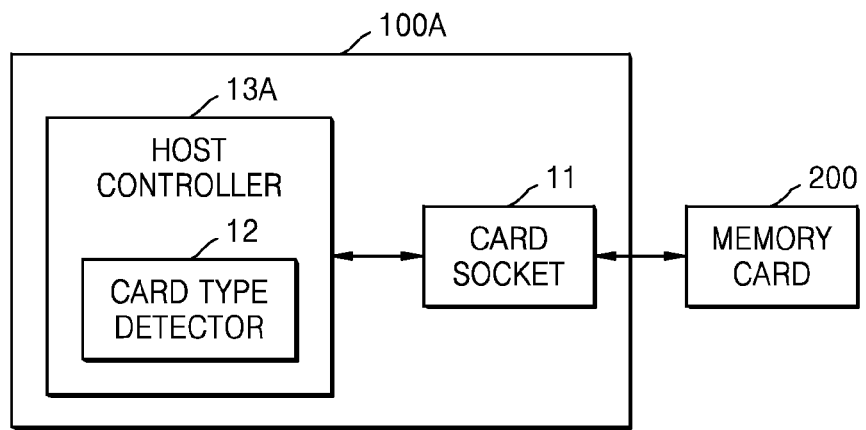
FIG. 4A is a block diagram of a host device according to an exemplary embodiment.
Figure 4B:
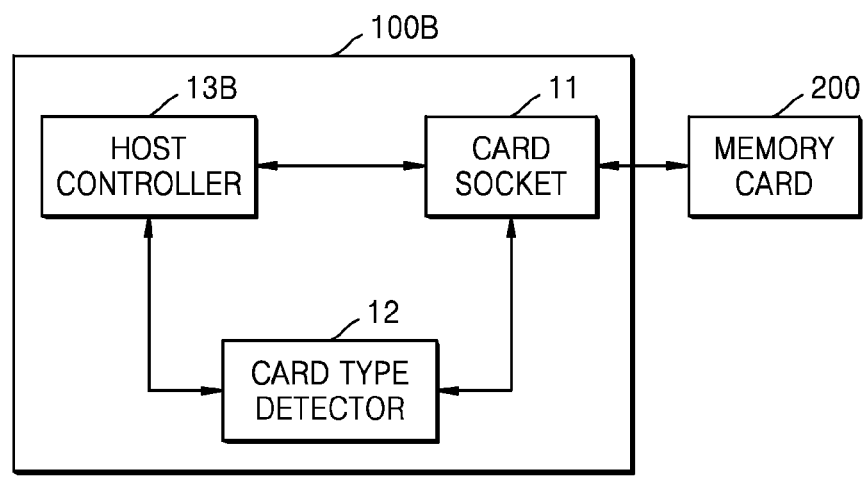
FIG. 4B is a block diagram of a host device according to another exemplary embodiment.

FIG. 4A is a block diagram of a host device 100A according to an exemplary embodiment, and FIG. 4B is a block diagram of a host device 100B according to another exemplary embodiment.

The host device 100A and the host device 100B may include an electronic device, such as a personal computer, a personal digital assistant (PDA), a digital camera, or a potable audio player.

Referring to FIG. 4A, the host device 100A may include a card socket 11 and a host controller 13A.

The host controller 13A may control components included in the host device 100A or control a memory card 200 connected to the host device 100A.

The host controller 13A may include a card type detector 12. The card type detector 12 may be implemented with software or hardware. Accordingly, the host controller 13A may detect a type of the memory card 200 inserted in the card socket 11. The operation of the card type detector 12 illustrated in FIG. 4A is same as that of the card type detector 12 illustrated in FIG. 1, and thus, repeated descriptions thereof are omitted.

The host controller 13A may determine a type of the memory card 200 inserted in the card socket 11 and perform an initialization operation of the memory card 200. Also, the host controller 13A may store data in the memory card 200 inserted in the card socket 11 or read data from the memory card 200, based on an interface standard corresponding to a determined card type.

Referring to FIG. 4B, the host device 100B may include a card socket 11, a card type detector 12, and a host controller 13B.

The card socket 11 and the card type detector 12, illustrated in FIG. 4B, are same as the card socket 11 and the card type detector 12, illustrated in FIG. 1, respectively, and thus, repeated descriptions thereof are omitted. The host device 100B illustrated in FIG. 4B is configured so that the card type detector 12 is separated from the host controller 13B.

The host controller 13B may control components included in the host device 100B or control a memory card 200 connected to the host device 100B. The host controller 13B may receive a card type determination signal from the card type detector 12 and control the memory card 200 based on the received card type determination signal. For example, the host device 100B may be designed so that some operations of the card type detector 12 are performed in the host controller 13B.

The host controller 13B may store data in the memory card 200 inserted in the card socket 11 or read data from the memory card 200, based on an interface standard corresponding to a determined card type.

Figure 5:
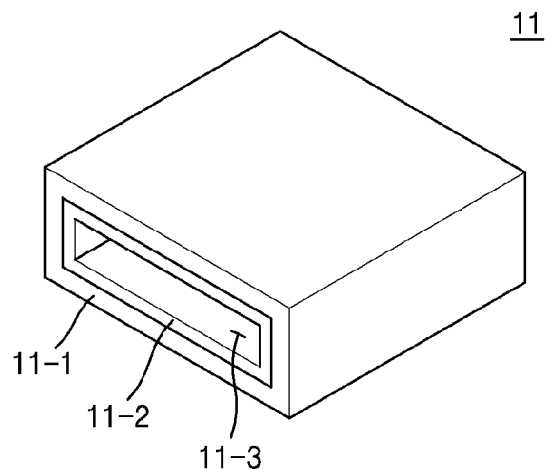
FIG. 5 is a perspective view of an outward shape of a card socket of FIG. 1.

FIG. 5 is a perspective view of the outward shape of the card socket 11 of FIG. 1.

Referring to FIG. 5, the card socket 11 may include an outer case 11-1 and an inner case 11-2.

The inner case 11-2 may be moved into the outer case 11-1, and a card slot 11-3 into which a memory card 200 is inserted is formed in the inner case 11-2.

Figure 6:
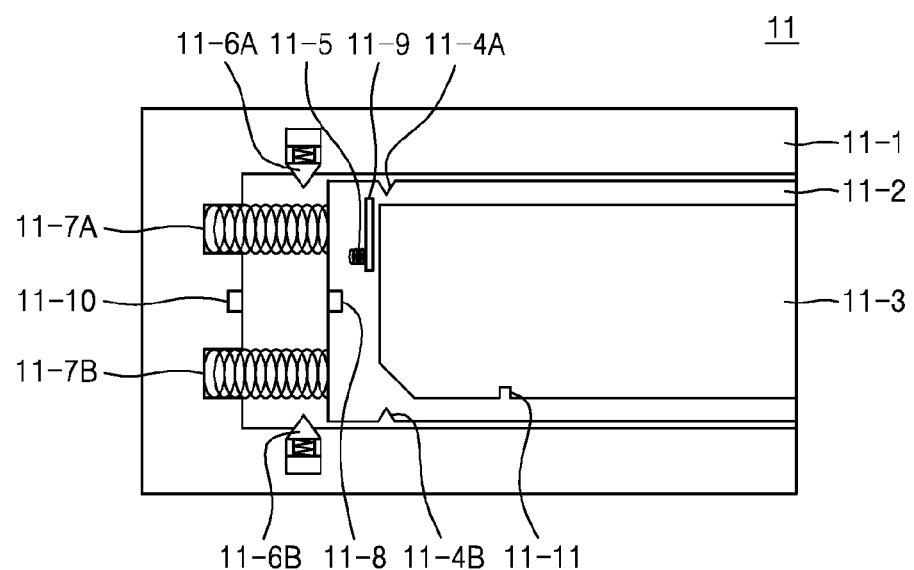
FIG. 6 is a cross-sectional view of a card socket of FIG. 1.

FIG. 6 is a cross-sectional view of the card socket 11 of FIG. 1.

Referring to FIG. 6, the outer case 11-1 may include a sensor 11-10, a first elastic 11-7A, and a second elastic 11-7B.

The sensor 11-10 is disposed in the outer case 11-1 and senses an insertion operation of the memory card 200 to generate a sensing signal S1. That is, the sensor 11-10 generates the sensing signal S1, which indicates that the memory card 200 has been inserted into the card socket 11, when the sensor 11-10 contacts a protruding member 11-8 disposed in the inner case 11-2.

The first and second elastic 11-7A and 11-7B push the inner case 11-2 toward the outside during a withdrawal operation of the memory card 200.

The inner case 11-2 may include the protruding member 11-8, a trigger 11-9, and a card fixer 11-11.

The protruding member 11-8 may be implemented with a metal and form an electrical contact with the sensor 11-10 during an insertion operation of the memory card 20. The sensor 11-10 generates the sensing signal S1 indicating an insertion state of the memory card 200 based on a change of a current or voltage which occurs as the electrical contact is formed.

The trigger 11-9 extrudes the memory card 200 from the card slot 11-3 during a withdrawal operation of the memory card 200. The trigger 11-9 may include elastic (e.g., spring).

The card fixing unit 11-11 fixes the memory card 200 to the inner case 11-2. That is, the card fixer 11-11 prevents the memory card 200 from separating from the inner case 11-2. The card fixer 11-11 is inserted in a fixing groove formed in the memory card 200 to fix the memory card 200 to the inner case 11-2.

First and second stoppers 11-6A and 11-6B are inserted in first and second insertion grooves 11-4A and 11-4B, respectively, during the insertion of the memory card 200 and are left from the first and second insertion grooves 11-4A and 11-4B, respectively, during the withdrawal of the memory card 200.

Figure 7:
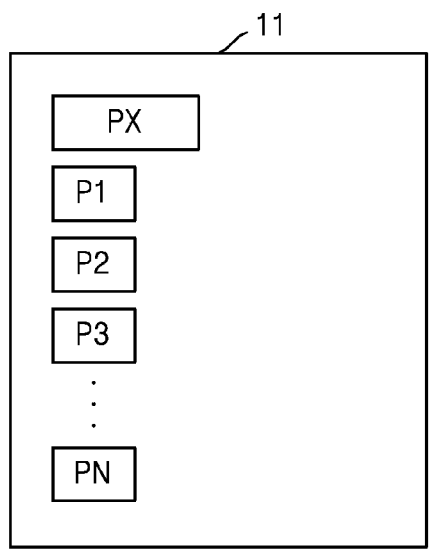
FIG. 7 is a diagram showing an example of a port arrangement of a card socket of FIG. 1.

FIG. 7 is a diagram showing an exemplary example of a port arrangement of the card socket 11 of FIG. 1.

Referring to FIG. 7, the card socket 11 may include a plurality of ports P1 to PN and PX.

The ports P1 to PN of the card socket 11 correspond to contact patterns of the at least two kinds of memory cards that may be inserted through one card slot. The port PX of the card socket 11 corresponds to a target port corresponding to any one kind of target memory card based on an external characteristic difference between different kinds of memory cards.

For example, the target port PX includes an electrical switch which is turned on or turned off according to an outer shape of a memory card which is inserted in the card socket 11.

For example, when a target memory card of the at least two kinds of memory cards which are supported by the card socket 11 is inserted in the card socket 11, the electrical switch formed in the target port PX may generate a signal indicating a first logic state. When a memory card other than the target memory card is inserted in the card socket 11, the electrical switch may generate a signal indicating a second logic state.

For example, the target port PX may be allocated as a port for supplying a power supply voltage of any one kind of target memory card of the at least two kinds of memory cards which are supported by the card socket 11.

For example, the target port PX may be allocated as a port for supplying a power supply voltage of a memory controller included in any one kind of target memory card.

For example, the target port PX is disposed in a position where the target port PX does not contact patterns disposed in a memory card other than the target memory card.

Figure 8:
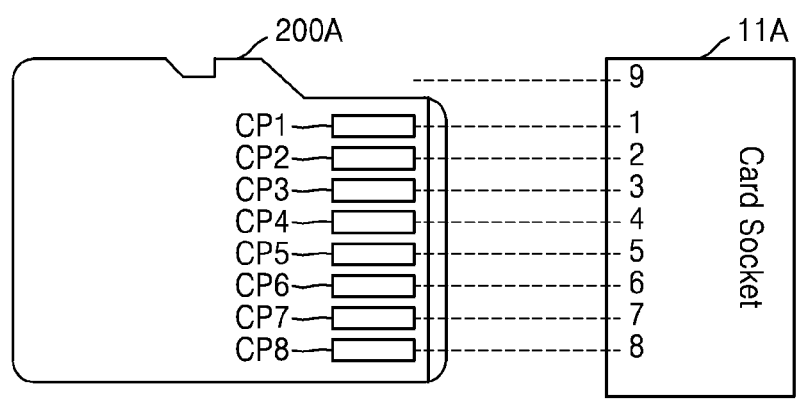
FIG. 8 is a diagram showing an example of a pin correspondence relation between a card socket, which supports different kinds of memory cards, and a legacy memory card, according to an exemplary embodiment.

FIG. 8 is a diagram showing an example of a pin correspondence relation between a card socket 11A, which supports different kinds of memory cards, and a legacy memory card, according to an exemplary embodiment.

Referring to FIG. 8, ports 1 to 8 disposed in a card socket 11A correspond to contact patterns of the at least two kinds of memory cards supported by the card socket 11A. A port 9 disposed in the card socket 11A is a target port corresponding to any one kind of target memory card based on an external characteristic difference between the different kinds of memory cards that are supported by the card socket 11A.

A first memory card 200A may be a legacy memory card of different kinds of memory cards supported by the card socket 11A. The legacy memory card may include a micro secure digital (SD) card. For example, contact patterns CP1 to CP8 of the first memory card 200A correspond to the ports 1 to 8 disposed in the card socket 11A, respectively.

An electrical contact pattern corresponding to the port 9 disposed in the card socket 11A does not exist in the first memory card 200A. In addition, the position of the port 9 in the card socket 11A may be determined so that the first memory card 200A does not contact the port 9 of the card socket 11A although the first memory card 200A is inserted in the card socket 11A.

Figure 9A:
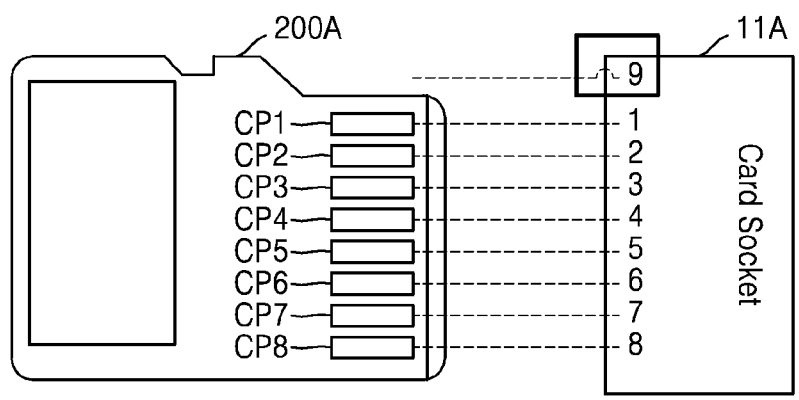
FIGS. 9A and 9B are diagrams showing an example of determining a card type by using external characteristics of a legacy memory card in a card socket supporting different kinds of memory cards, according to an exemplary embodiment.
Figure 9B:
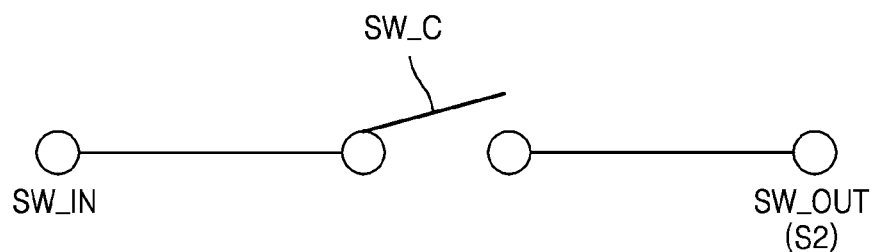

FIGS. 9A and 9B are diagrams showing an example of determining a card type by using external characteristics of a legacy memory card in a card socket 11A supporting different kinds of memory cards, according to an exemplary embodiment.

Referring to FIG. 9A, contact patterns CP1 to CP8 are disposed in a first memory card 200A that is a legacy memory card. Ports 1 to 9 are disposed in the card socket 11A supporting different kinds of memory cards. For example, the port 9 of the card socket 11A is a target port and may include an electrical switch.

The port 9 of the card socket 11A includes an electrical switch which is turned on or turned off according to the outer shape of a memory card inserted in the card socket 11A.

When the first memory card 200A is inserted in the card socket 11A, the contact patterns CP1 to CP8 of the first memory card 200A contact the ports 1 to 8 disposed in the card socket 11A, respectively. However, although the first memory card 200A is inserted in the card socket 11A, the first memory card 200A does not contact the port 9 disposed in the card socket 11A.

The port 9 of the card socket 11A which includes the electrical switch may be represented by an equivalent circuit as illustrated in FIG. 9B. Referring to FIG. 9B, a switch formed in the port 9 of the card socket 11A may be represented by an input terminal SW_IN, an output terminal SW_OUT, and a control terminal SW_C. The port 9 of the card socket 11A may act as the control terminal SW_C. A signal S2 that is used for determining a memory card type through the port 9 is generated from the output terminal SW_OUT.

For example, a power supply voltage is applied to the input terminal SW_IN, and the control terminal SW_C electrically connects the input terminal SW_IN to the output terminal SW_OUT or electrically disconnects the input terminal SW_IN from the output terminal SW_OUT, based on the type of a memory card that is inserted in the card socket 11A.

Since the first memory card 200A does not contact the port 9 disposed in the card socket 11A although the first memory card 200A is inserted in the card socket 11A, the switch formed in the port 9 of the card socket 11A is turned off as illustrated in FIG. 9B.

Figure 10:
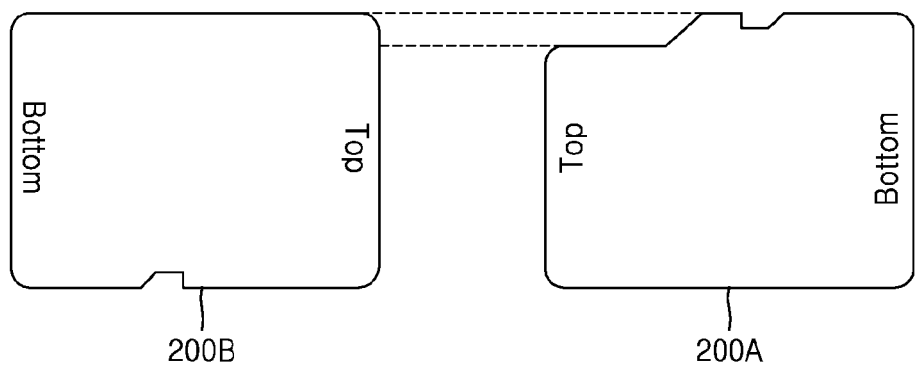
FIG. 10 is a diagram showing external characteristics of different kinds of memory cards that are supported by a card socket, according to an exemplary embodiment.

FIG. 10 is a diagram showing external characteristics of different kinds of memory cards that are supported by the card socket 11A, according to an exemplary embodiment.

Referring to FIG. 10, outer shapes of first and second memory cards 200A and 200B that are different in kind and are supported by the card socket 11A are shown.

For example, the first memory card 200A that is a legacy memory card may be a micro secure digital (SD) card which has a 'Gun shape'. In detail, the micro SD card has a form in which a top portion becomes narrower than a bottom portion. Since the top portion of the first memory card 200A is inserted in the card socket 11A, a top left-hand of the first memory card 200A does not contact a target port of the card socket 11A.

The second memory card 200B may be a new type of memory card. Since the second memory card 200B has a shape that is close to a rectangle, the second memory card 200B contacts to the target port of the card socket 11A when the second memory card 200B is inserted in the card socket 11A.

Figure 11A:
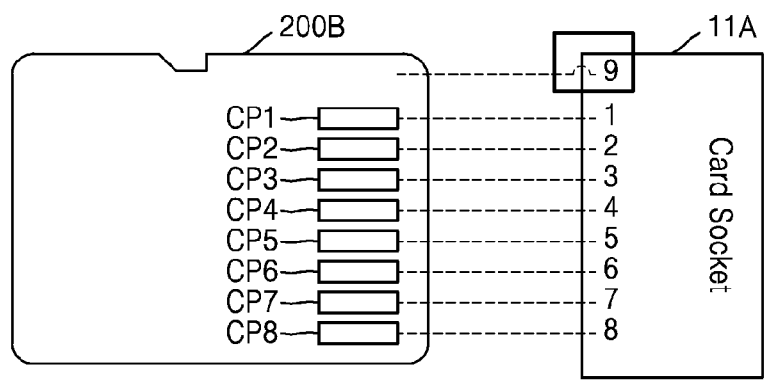
FIGS. 11A and 11B are diagrams showing an example of determining a card type by using external characteristics of a new type of memory card in a card socket supporting different kinds of memory cards, according to an exemplary embodiment.
Figure 11B:
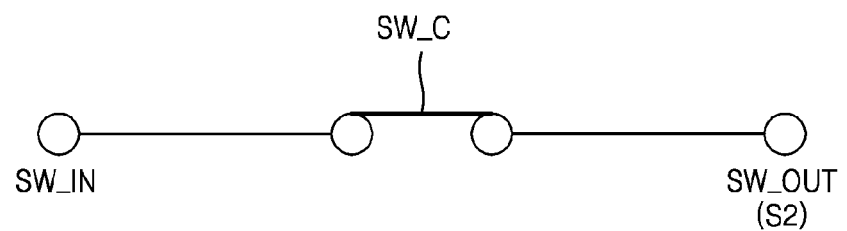

FIGS. 11A and 11B are diagrams showing an example of determining a card type by using external characteristics of a new type of memory card in a card socket 11A supporting different kinds of memory cards, according to an exemplary embodiment.

Referring to FIG. 11A, contact patterns CP1 to CP8 are disposed in a second memory card 200B that is a new type of memory card. Ports 1 to 9 are disposed in the card socket 11A supporting different kinds of memory cards. For example, the port 9 of the card socket 11A is a target port and may include an electrical switch. When the second memory card 200B is inserted in the card socket 11A, the contact patterns CP1 to CP8 of the second memory card 200B contact the ports 1 to 8 disposed in the card socket 11A, respectively, and the second memory card 200B contacts the port 9 disposed in the card socket 11A.

Referring to FIG. 11B, a switch formed in the port 9 of the card socket 11A may be represented by an input terminal SW_IN, an output terminal SW_OUT, and a control terminal SW_C. The port 9 of the card socket 11A may act as the control terminal SW_C. A signal S2 that is used for determining a memory card type through the port 9 is generated from the output terminal SW_OUT.

Since the second memory card 200B contacts the port 9 disposed in the card socket 11A when the second memory card 200B is inserted in the card socket 11A, the switch formed in the port 9 of the card socket 11A is turned on as illustrated in FIG. 11B.

Figure 12A:
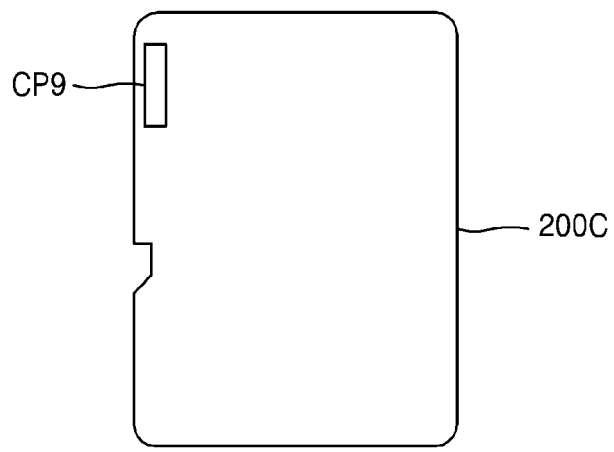
FIGS. 12A and 12B are diagrams showing an example of determining a card type by using external characteristics of a new type of memory card in a card socket supporting different kinds of memory cards, according to another exemplary embodiment.
Figure 12B:
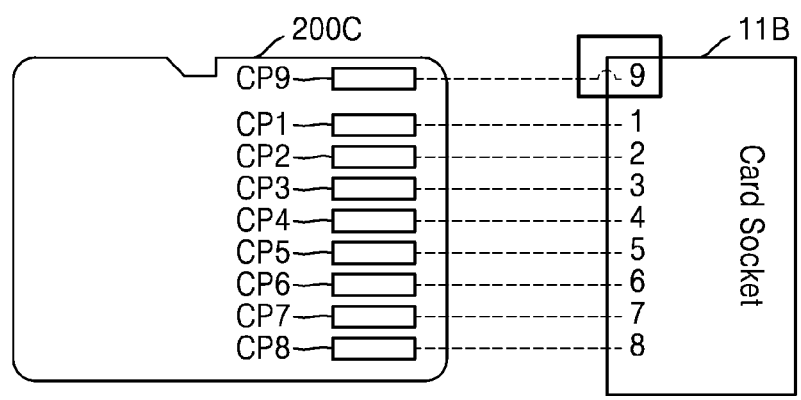

FIGS. 12A and 12B are diagrams showing an example of determining a card type by using external characteristics of a new type of memory card in a card socket 11B supporting different kinds of memory cards, according to another exemplary embodiment.

Referring to FIG. 12A, a target contact pattern PX, which is an electrical contact pattern corresponding to a target port disposed in the card socket 11B, may be added to a third memory card 200C that is a new type of memory card.

Referring to FIG. 12B, contact patterns CP1 to CP9 are disposed in the third memory card 200C. The contact pattern CP9 corresponds to the target contact pattern PX.

Ports 1 to 9 are disposed in the card socket 11B supporting different kinds of memory cards. For example, while the port 9 of the card socket 11A includes an electrical switch, the port 9 of the card socket 11B may be formed in the same form as the ports 1 to 8.

When the third memory card 200C is inserted in the card socket 11B, the contact patterns CP1 to CP9 of the third memory card 200C contact the ports 1 to 9 disposed in the card socket 11B, respectively. For example, the port 9 of the card socket 11B may be allocated as a port for supplying a power supply voltage of the third memory card 200C. Alternatively, the port 9 of the card socket 11B may be allocated as a port for supplying a power supply voltage of a memory controller included in the third memory card 200C.

Outer shapes and arrangement specifications of contact patterns of various memory cards that may be supported by a card socket according to an exemplary embodiment are described below with reference to FIGS. 13 to 15.

Figure 13A:
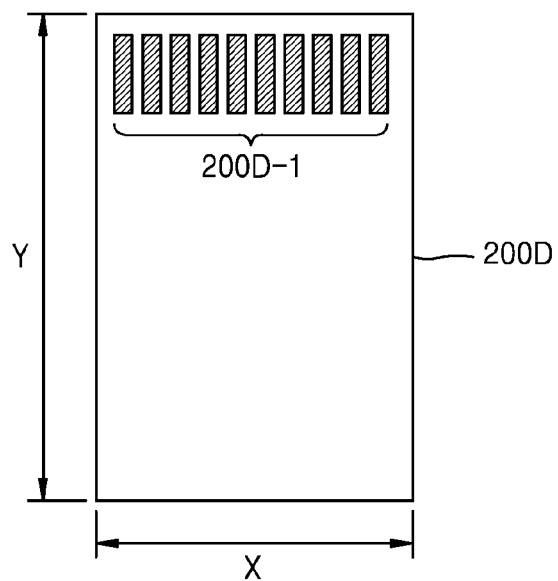
FIGS. 13A and 13B are diagrams showing an example of the outward shape and contact pattern arrangement specifications of a legacy memory card that is supported by a card socket, according to an exemplary embodiment.
Figure 13B:
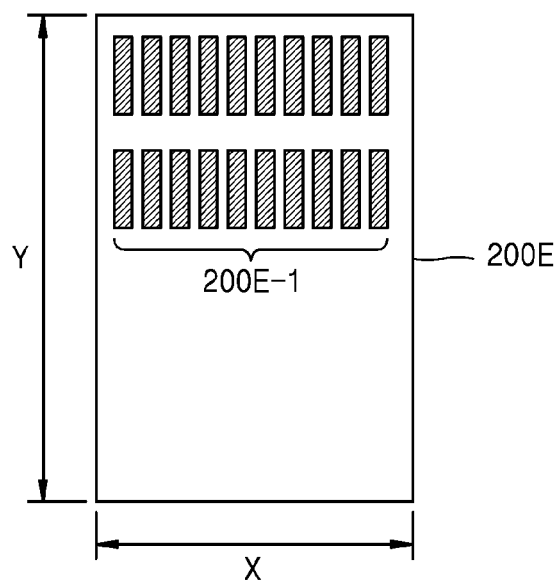

FIGS. 13A and 13B are diagrams showing an example of the outer shape and contact pattern arrangement specifications of a legacy memory card that is supported by the card socket 11 according to the exemplary embodiment.

FIG. 13A shows the outer shape of a first legacy memory card 200D, which is supported by the card socket 11, and arrangement specifications of contact patterns 200D-1, and FIG. 13B shows the outer shape of a second legacy memory card 200E, which is supported by the card socket 11, and arrangement specifications of contact patterns 200E-1.

Referring to FIGS. 13A and 13B, the outer shape of the first and second legacy memory cards 200D and 200E are the same each other. That is, both the first and second legacy memory cards 200D and 200E have a rectangular shape. A horizontal length of each of the first and second legacy memory cards 200D and 200E is X, and a vertical length of each of the first and second legacy memory cards 200D and 200E is Y. The first legacy memory card 200D has a structure in which the electrical contact patterns 200D-1 are disposed in a single row, whereas the second legacy memory card 200E has a structure in which the electrical contact patterns 200E-1 are disposed in a plurality of rows.

Figure 14A:
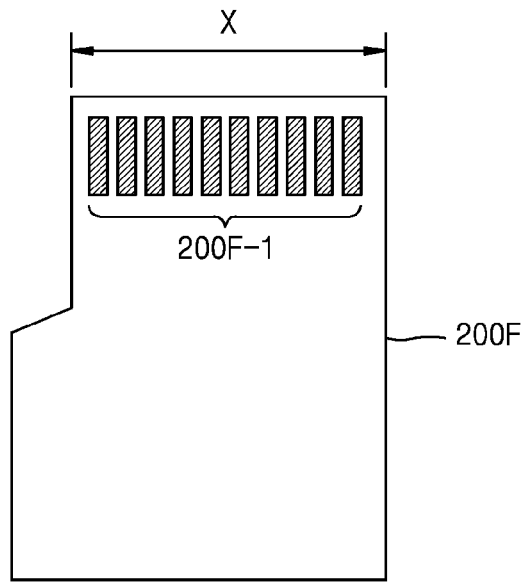
FIGS. 14A and 14B are diagrams showing an example of the outward shape and contact pattern arrangement specifications of a legacy memory card that is supported by a card socket, according to another exemplary embodiment.
Figure 14B:
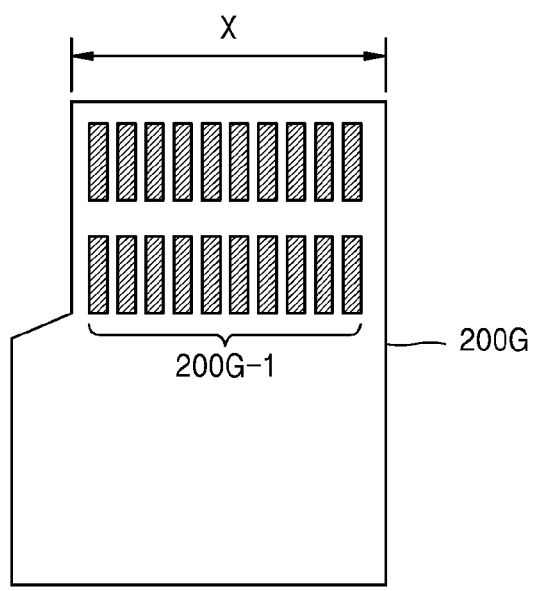

FIGS. 14A and 14B are diagrams showing another example of the outer shape and contact pattern arrangement specifications of a legacy memory card that is supported by the card socket 11 according to the exemplary embodiment.

FIG. 14A shows the outer shape of a third legacy memory card 200F, which is supported by the card socket 11, and arrangement specifications of contact patterns 200E-1, and FIG. 14B shows the outer shape of a fourth legacy memory card 200G, which is supported by the card socket 11, and arrangement specifications of contact patterns 200G-1.

Referring to FIGS. 14A and 14B, the outer shape of the third and fourth legacy memory cards 200F and 200G are the same each other. That is, in the third and fourth legacy memory cards 200F and 200G, a horizontal length of a upper portion thereof that is inserted in the card socket 11 is X and a vertical length is Y. In addition, a length of a lower portion thereof is larger than a length of the upper portion thereof. The third legacy memory card 200F has a structure in which the contact patterns 200E-1 are disposed in a single row, whereas the fourth legacy memory card 200G has a structure in which the contact patterns 200G-1 are disposed in a plurality of rows.

Figure 15A:
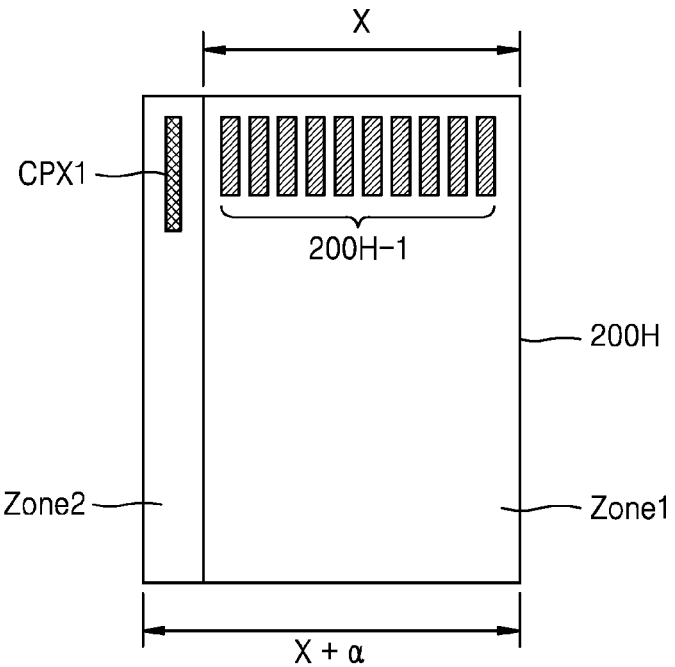
FIGS. 15A and 15B are diagrams showing an example of the outward shape and contact pattern arrangement specifications of a new memory card that is supported by a card socket, according to an exemplary embodiment.
Figure 15B:
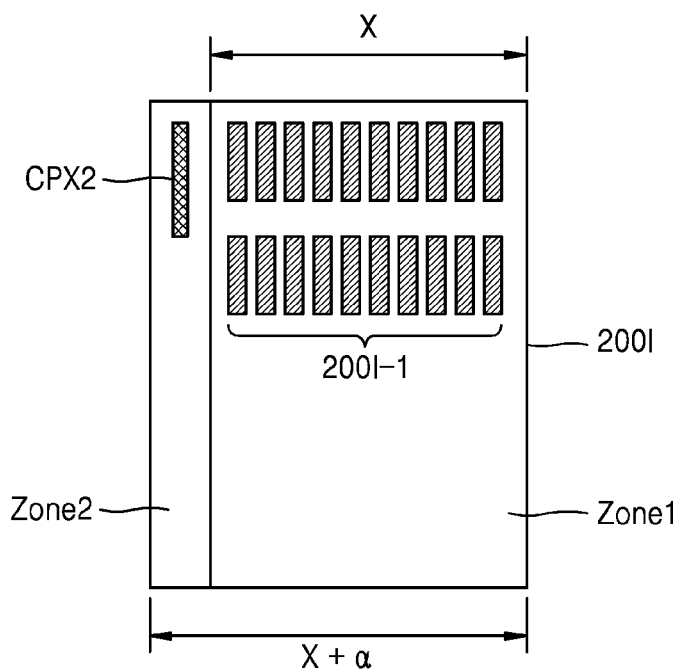

FIGS. 15A and 15B are diagrams showing an example of the outer shape and contact pattern arrangement specifications of a new memory card that is supported by the card socket 11 according to the exemplary embodiment.

FIG. 15A shows the outer shape of a fifth memory card 200H of a new type, which is supported by the card socket 11, and arrangement specifications of contact patterns 200H-1, and FIG. 15B shows the outer shape of a sixth memory card 200I of a new type, which is supported by the card socket 11, and arrangement specifications of contact patterns 200I-1.

Referring to FIGS. 15A and 15B, the outward shape of the fifth and sixth memory cards 200H and 200I are the same each other. Horizontal lengths of both the fifth memory card 200H and the sixth memory card 200I are X+α. The fifth memory card 200H has a structure in which the contact patterns 200H-1 are disposed in a single row, whereas the sixth memory card 200I has a structure in which the contact patterns 200I-1 are disposed in a plurality of rows.

A horizontal length of a first zone Zone1 of each of the fifth and sixth memory cards 200H and 200I is X and is equal to a horizontal length of a upper portion, which is inserted in the card socket 11, of each of the first through fourth legacy memory cards 200D, 200E, 200F, and 200G. A second zone Zone2 of each of the fifth and sixth memory cards 200H and 200I is allocated to a position where the contact patterns of the first through fourth legacy memory cards 200D, 200E, 200F, and 200G are not disposed.

A target contact pattern CPX1 or CPX2 that is an electrical contact pattern corresponding to the target port PX disposed in the card socket 11 is disposed in the second zone Zone2 of each of the fifth and sixth memory cards 200H and 200I.

The target contact pattern CPX1 of the fifth memory card 200H and the target contact pattern CPX2 of the sixth memory card 200I each may be allocated as a contact pattern for a power supply voltage.

Figure 16:
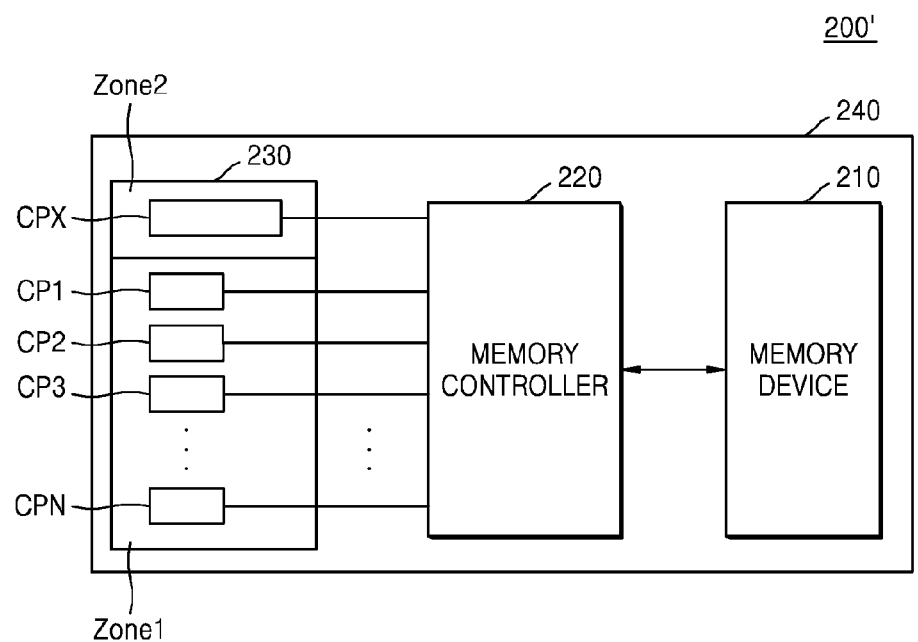
FIG. 16 is a block diagram of a new memory card according to an exemplary embodiment.

FIG. 16 is a block diagram of a new memory card 200' according to an exemplary embodiment.

Referring to FIG. 16, the new memory card 200' may include a memory device 210, a memory controller 220, contact patterns 230, and a printed circuit board (PCB) 240. For example, the new memory card 200' may include the third memory card 200C of FIG. 12, the fifth memory card 200H of FIG. 15, or the sixth memory card 200I of FIG. 15.

The memory device 210 and the memory controller 220 are mounted on the PCB 240. The memory device 210 and the memory controller 220 may be implemented in a single integrated circuit chip or in a plurality of integrated circuit chips.

The contact patterns 230 are electrically connected to the memory controller 220 through the PCB 240. For example, a first set of electrical contact patterns CP1 to CPN for at least one signal are disposed in a first zone Zone1 of the PCB 240, and a contact pattern CPX for a power supply voltage is disposed in a second zone Zone2. The position of the contact pattern CPX is determined so as not to overlap with the position of electrical contact patterns disposed in a legacy memory card included in different kinds of memory cards that are supported by a host device in which the memory card 200' is inserted. For example, the contact pattern CPX may be electrically connected to a power supply voltage terminal of the memory controller 220. Alternatively, the contact pattern CPX may be electrically connected to a power supply voltage terminal of the memory device 210. For example, the legacy memory card may include a micro SD card.

The memory device 210 may be a nonvolatile memory device. For example, the memory device 210 may be implemented as, but not limited to, a flash memory chip, a phase change RAM (PRAM) chip, a ferroelectric RAM (FRAM) chip, and/or a magnetic RAM (MRAM) chip. Also, the memory device 210 may have a form in which at least one nonvolatile memory device and at least one volatile memory device are mixed. The memory device 210 may also have a form in which at least two kinds of nonvolatile memory devices are mixed.

The memory controller 220 may perform a control operation for the memory device 210. In detail, the memory controller 220 may generate an address ADDR, a command CMD, and a control signal CTRL, which are used to control the memory device 210, based on a command and an address which are received from a host device through the contact patterns 230. Also, the memory controller 220 may control a program operation (or a write operation), a read operation, and an erase operation with respect to the memory device 210 by providing the address ADDR, the command CMD, and the control signal CTRL to the memory device 210. In addition, data DATA for a program operation may be transmitted from the memory controller 220 to the memory device 210, and data DATA read from the memory device 210 may be transmitted to the memory controller 220.

Figure 17:
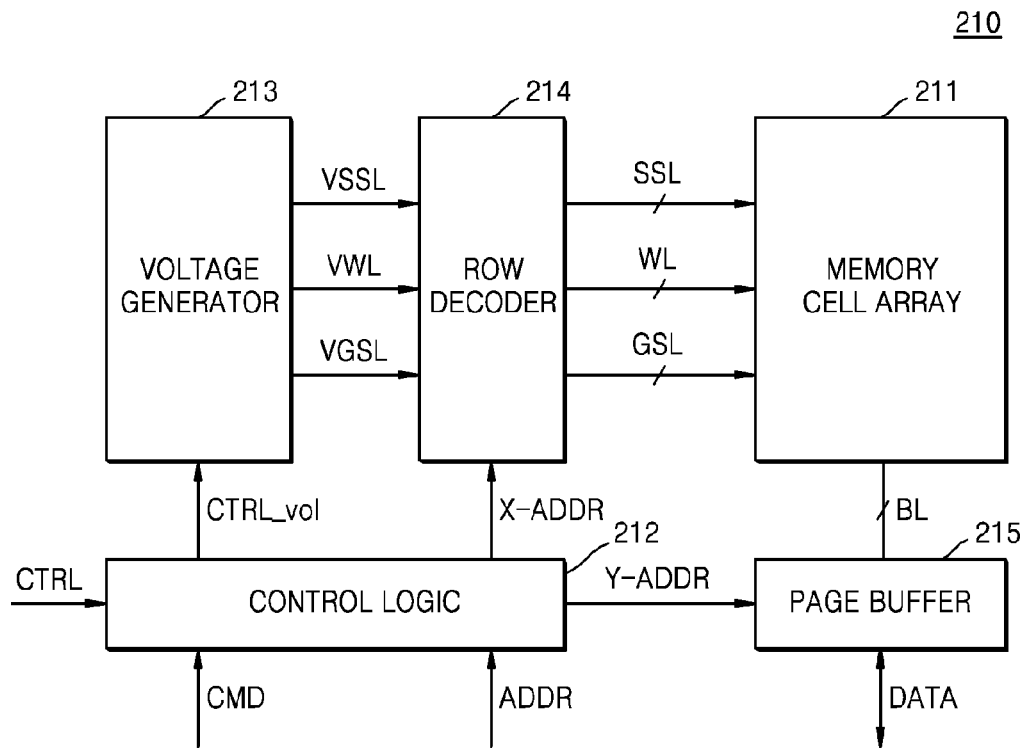
FIG. 17 is a block diagram of a configuration of a memory device of FIG. 16.

FIG. 17 is a block diagram of an example of the memory device 210 of FIG. 16.

Referring to FIG. 17, the memory device 210 may include a memory cell array 211, a control logic 212, a voltage generator 213, a row decoder 214, and a page buffer 215.

The memory cell array 211 may be connected to one or more string selection lines SSL, a plurality of word lines WL, and one or more ground selection lines GSL. Also, the memory cell array 211 may be connected to a plurality of bit lines BL. The memory cell array 211 may include a plurality of memory cells that are disposed at points where the plurality of word lines WL and the plurality of bit lines BL intersect each other.

When an erase voltage is applied to the memory cell array 211, the plurality of memory cells change to an erase state, and when a program voltage is applied to the memory cell array 211, the plurality of memory cells change to a program state. In this case, each of the memory cells may have one state selected from an erase state and first through nth program states (P1 through Pn) according to a threshold voltage.

Here, n may be a natural number equal to or greater than 2. For example, when each of the memory cells is a 2-bit level cell, n may be 3. Alternatively, when each of the memory cells is a 3-bit level cell, n may be 7. Alternatively, when each of the memory cells is a 4-bit level cell, n may be 15. As such, the plurality of memory cells may include multi-level cells. However, the inventive concept is not limited thereto, and the plurality of memory cells may include single-level cells.

The control logic 212 may output various control signals for writing data to the memory cell array 211 or reading data from the memory cell array 211, based on a command CMD, an address ADDR, and a control signal CTRL which are received from the memory controller 220. Accordingly, the control logic 212 may control various operations in the memory device 210.

The various control signals output from the control logic 212 may be applied to the voltage generator 213, the row decoder 214, and the page buffer 215. In detail, the control logic 212 may apply a voltage control signal CTRL_vol to the voltage generator 213, a row address X_ADDR to the row decoder 214, and a column address Y_ADDR to the page buffer 215.

The voltage generator 213 may generate various voltages for performing a program operation, a read operation, and an erase operation on the memory cell array 211 based on the voltage control signal CTRL_vol. In detail, the voltage generator 213 may generate a first driving voltage VWL for driving the plurality of word lines WL, a second driving voltage VSSL for driving the plurality of string selection lines SSL, and a third driving voltage VGSL for driving the plurality of ground selection lines GSL.

In this case, the first driving voltage VWL may be a program voltage (or a write voltage), a read voltage, an erase voltage, a pass voltage, or a program verification voltage. The second driving voltage VSSL may be a string selection voltage, that is, an on voltage or an off voltage. The third driving voltage VGSL may be a ground selection voltage, that is, an on voltage or an off voltage.

The row decoder 214 may be connected to the memory cell array 211 through the plurality of word lines WL, and may activate some of the plurality of word lines WL in response to the row address X_ADDR that is received from the control logic 212. In detail, during a read operation, the row decoder 214 may apply a read voltage to selected word lines and a pass voltage to non-selected word lines.

During a program operation, the row decoder 214 may apply a program voltage to selected word lines and a pass voltage to non-selected word lines. In FIG. 17, during at least one of program loops, the row decoder 214 may apply a program voltage to selected word lines and additionally selected word lines.

The page buffer 215 may be connected to the memory cell array 211 through the plurality of bit lines BL. In detail, during a read operation, the page buffer 215 may operate as a sense amplifier and may output data DATA stored in the memory cell array 211. During a program operation, the page buffer 215 may operate as a write driver and may input data DATA that is to be stored in the memory cell array 211.

Figure 18:
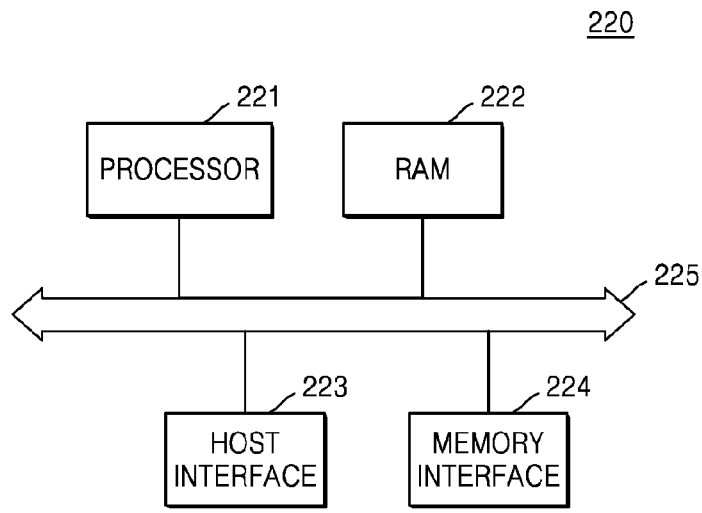
FIG. 18 is a block diagram of a configuration of a memory controller of FIG. 16.

FIG. 18 is a block diagram of an example of the memory controller 220 of FIG. 16.

As shown in FIG. 18, the memory controller 220 may include a processor 221, a random access memory (RAM) 222, a host interface 223, a memory interface 224, and a bus 225.

Elements of the memory controller 220 may be electrically connected to each other via the bus 225.

The processor 221 may generally control an operation of the memory card 200 by using a program code and data stored in the RAM 222. For example, the processor 221 may be a micro-processor or a central processing unit (CPU). When the memory card 200 is initialized, the processor 221 may read a program code and data, which are necessary for controlling operations that are performed in the memory card 200, from the memory device 200 to load the program code and the data to the RAM 120.

The processor 221 provides a read command and an address to the memory device 210 during a read operation and provides a write command, an address, and data to the memory device 210 during a write operation. The processor 221 performs a process of converting a logical address received from a host device into a physical address by using system data stored in the RAM 222.

The RAM 222 temporarily stores data received via the host interface 223 and data generated in the processor 221 or temporarily stores data read from the memory device 210. Also, the RAM 222 stores system data and program codes read from the memory device 210. The RAM 222 may be implemented as, but not limited to, a dynamic random access memory (DRAM), a static random access memory (SRAM), a PRAM, an FRAM, an RRAM, and/or an MRAM. The system data is information for managing the memory device 210 and includes mapping table information that is used for converting a logical address into a physical address of the memory device 210.

The host interface 223 includes a data exchange protocol with a host device connected to the memory card 200 and interconnects the memory card 200 and the host device. The host interface 223 may include an advanced technology attachment (ATA) interface, a serial advanced technology attachment (SATA) interface, a parallel advanced technology attachment (PATA) interface, a universal serial bus (USB) or serial attached small computer system (SAS) interface, a small computer system interface (SCSI), an embedded multimedia card (eMMC) interface, and a universal flash storage (UFS) interface. However, it is understood that one or more other exemplary embodiments are not limited thereto. The host interface 223 may receive a command, an address, and data from the host device under the control of the processor 221 or may transmit data to the host device.

The memory interface 224 is electrically connected to the memory device 210. The memory interface 224 may transmit a command, an address, and data to the memory device 210 under the control of the processor 221 or may receive data from the memory device 210. The memory interface 224 may be configured to support a NAND flash memory or an NOR flash memory. The memory interface 224 may be configured to perform software or hardware interleaving operations through a plurality of channels.

Memory card identification methods according to exemplary embodiments, which are performed in the host device 100A or 100B of FIG. 4A or FIG. 4B, are described below with reference to flowcharts of FIGS. 19 to 21.

Figure 19:
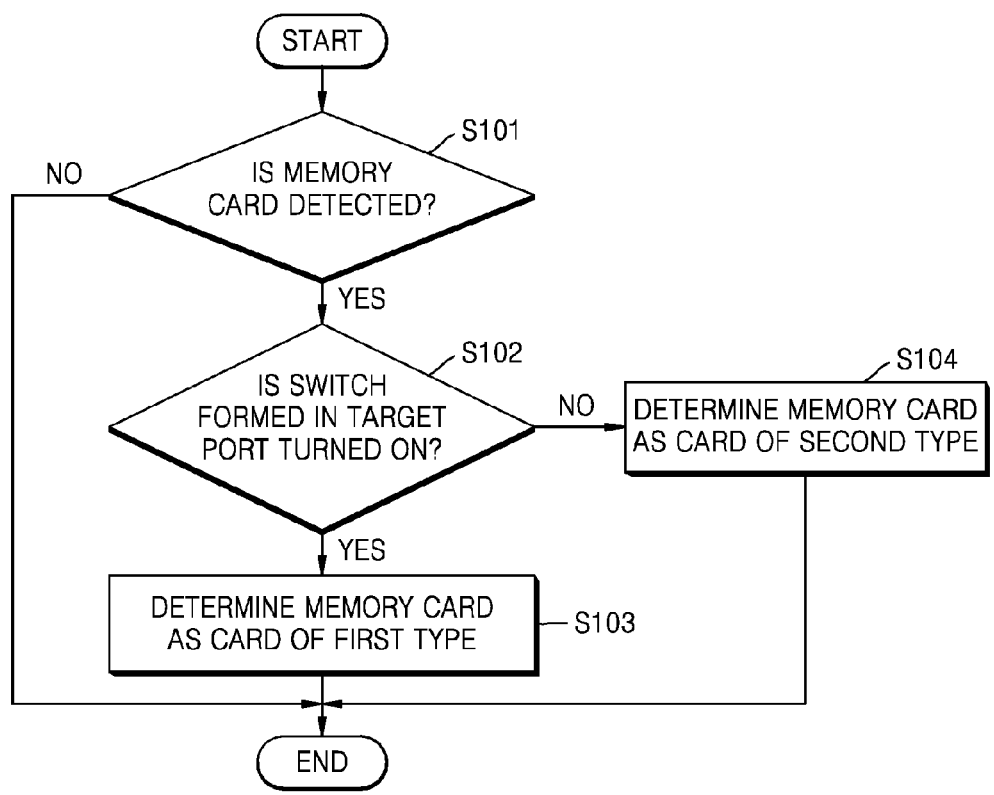
FIG. 19 is a flowchart of a method of identifying memory cards, according to an exemplary embodiment.

FIG. 19 is a flowchart of a method of identifying memory cards, according to an exemplary embodiment.

The host device 100A or 100B determines whether the memory card 200 inserted in the card socket 11 is detected (Operation S101). For example, the host device 100A or 100B may determine whether the memory card 200 is inserted in the card socket 11 through the card slot 11-3 by using the sensor 11-10 disposed in the card socket 11.

If it is determined that the memory card 200 inserted in the card socket 11 is detected, the host device 100A or 100B determines whether an electrical switch formed in the target port PX of the card socket 11 is turned on (Operation S102). As described above, the target port PX of the target socket 11 may include an electrical switch which is turned on or tuned off according to an outer shape of a memory card inserted in the card socket 11.

If it is determined that the electrical switch is turned on, the host device 100A or 100B determines the memory card 200 inserted in the card socket 11 as a card of a first type (Operation S103).

If it is determined that the electrical switch is turned off, the host device 100A or 100B determines the memory card 200 inserted in the card socket 11 as a card of a second type (Operation S104).

For example, the card of the first type may be set as a new type of card and the card of the second type may be set as a legacy type of card. Alternatively, the card of the first type may be set as a legacy type of card and the card of the second type may be set as a new type of card.

Figure 20:
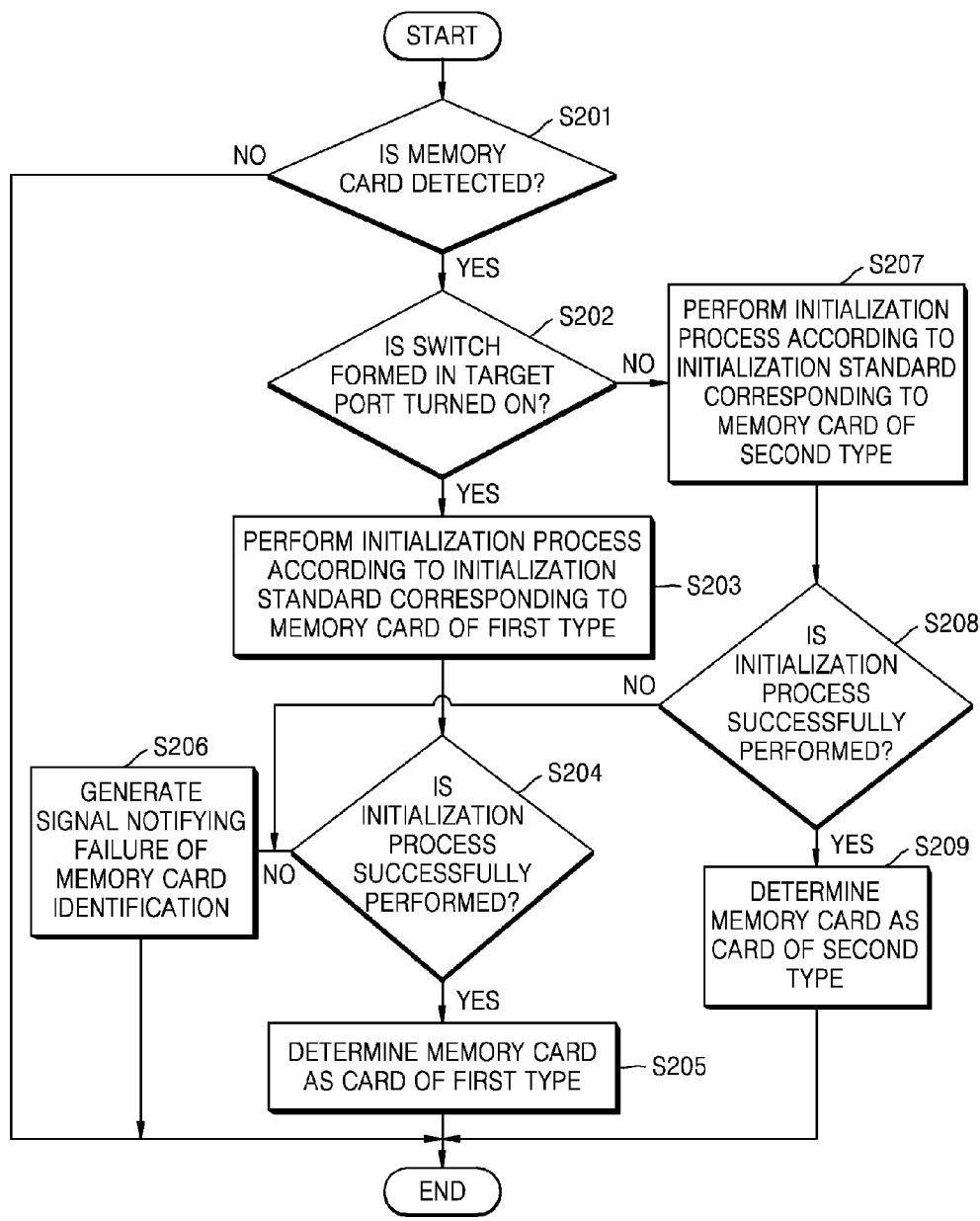
FIG. 20 is a flowchart of a method of identifying memory cards, according to another exemplary embodiment.

FIG. 20 is a flowchart of a method of identifying memory cards, according to another exemplary embodiment.

The host device 100A or 100B determines whether the memory card 200 inserted in the card socket 11 is detected (Operation S201). For example, the host device 100A or 100B may determine whether the memory card 200 is inserted in the card socket 11 through the card slot 11-3 by using the sensor 11-10 disposed in the card socket 11.

If it is determined that the memory card 200 inserted in the card socket 11 is detected, the host device 100A or 100B determines whether an electrical switch formed in the target port PX of the card socket 11 is turned on (Operation S202).

If it is determined that the electrical switch is turned on, the host device 100A or 100B performs an initialization process for the memory card 200 inserted in the card socket 11 according to an initialization standard corresponding to a memory card of a first type (Operation S203). That is, the host device 100A or 100B assumes the memory card 200 inserted in the card socket 11 as a first type and performs an initialization process by applying a power supply voltage for powering the memory card of the first type to the card socket 11.

The host device 100A or 100B determines whether the initialization process in Operation S203 has been successfully performed (Operation S204). For example, the host device 100A or 100B may determine whether the initialization process has been successfully performed, based on initialization process response information that is received from the memory card 200 through the card socket 11.

If, in Operation S204, it is determined that the initialization process has been successfully performed, the host device 100A or 100B determines the memory card 200 inserted in the card socket 11 as the memory card of the first type (operation S205). Accordingly, the host device 100A or 100B may store data in the memory card 200 inserted in the card socket 11 or read data from the memory card 200, based on an interface standard corresponding to the memory card of the first type.

However, if it is determined that the initialization process has been failed, the host device 100A or 100B generates a signal indicating a failure of the memory card identification process (Operation S206).

If it is determined that the electrical switch formed in the target port PX of the card socket 11 is turned off, the host device 100A or 100B performs an initialization process for the memory card 200 inserted in the card socket 11 according to an initialization standard corresponding to a memory card of a second type (Operation S207). That is, the host device 100A or 100B assumes the memory card 200 inserted in the card socket 11 as a memory card of a second type and performs an initialization process by applying a power supply voltage for powering the memory card of the second type to the card socket 11.

The host device 100A or 100B determines whether the initialization process in Operation S207 has been successfully performed (Operation S208). For example, the host device 100A or 100B may determine whether the initialization process has been successfully performed, based on initialization process response information that is received from the memory card 200 through the card socket 11.

If, in Operation S208, it is determined that the initialization process has been successfully performed, the host device 100A or 100B determines the memory card 200 inserted in the card socket 11 as a memory card of a second type (operation S209). Accordingly, the host device 100A or 100B may store data in the memory card 200 inserted in the card socket 11 or read data from the memory card 200, based on an interface standard corresponding to the memory card of the second type.

However, if it is determined that the initialization process has been failed, the host device 100A or 100B generates a signal indicating a failure of the memory card identification process (Operation S206).

Figure 21:
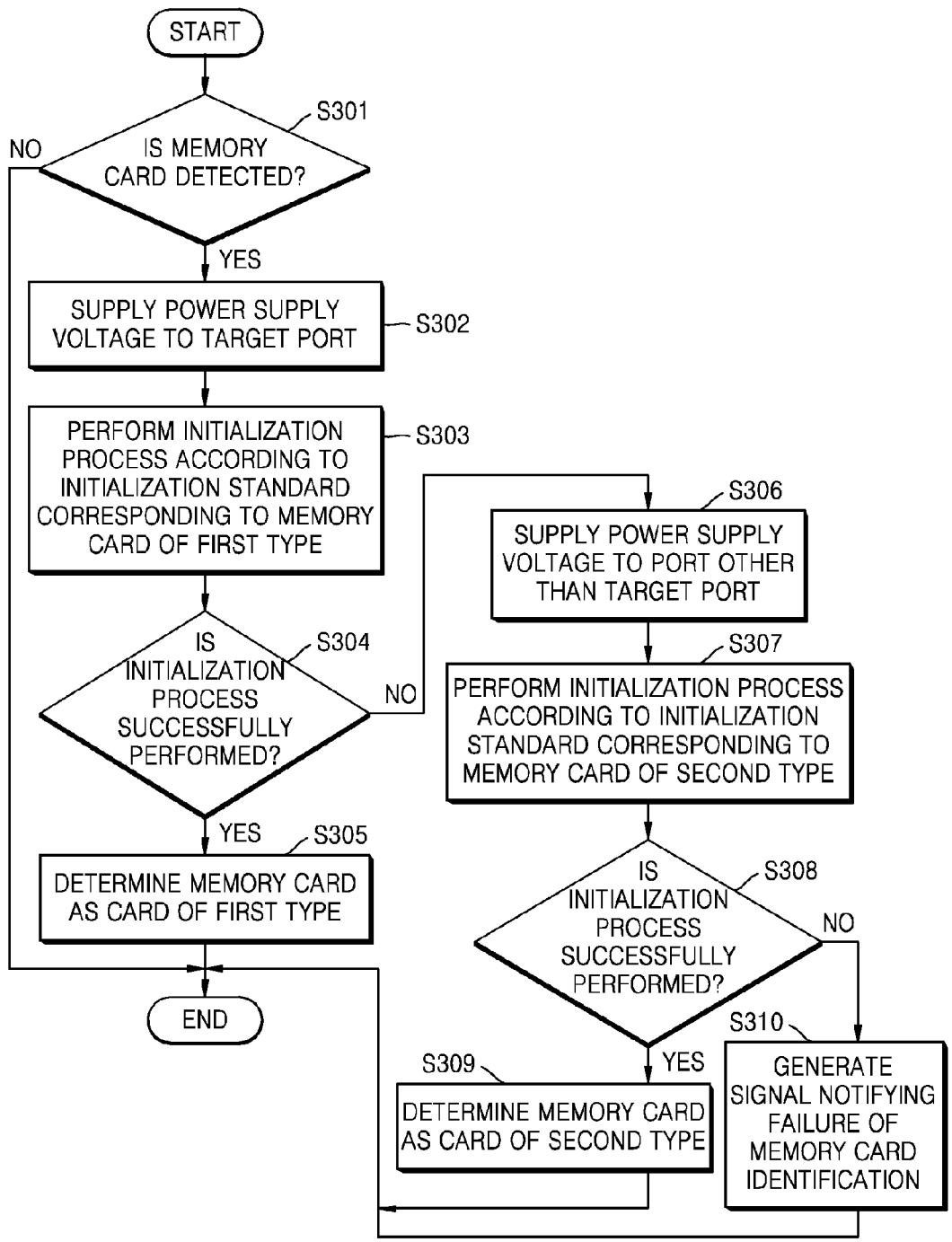
FIG. 21 is a flowchart of a method of identifying memory cards, according to another exemplary embodiment.

FIG. 21 is a flowchart of a method of identifying memory cards, according to another exemplary embodiment.

The host device 100A or 100B determines whether the memory card 200 inserted in the card socket 11 is detected (Operation S301).

If it is determined that the memory card 200 inserted in the card socket 11 is detected, the host device 100A or 100B supplies a power supply voltage to the target port PX of the card socket 11 (Operation S302). That is, the host device 100A or 100B supplies a power supply voltage for powering a memory card of a first type to the target port PX. Accordingly, the power supply voltage applied to the target port PX of the card socket 11 is supplied to the memory card 200 inserted in the card socket 11.

After applying the power supply to the target port PX, the host device 100A or 100B performs an initialization process for the memory card 200 inserted in the card socket 11 according to an initialization standard corresponding to the memory card of the first type (Operation S303). That is, the host device 100A or 100B assumes the memory card 200 inserted in the card socket 11 as a memory card of a first type and then performs an initialization process.

The host device 100A or 100B determines whether the initialization process has been successfully performed (Operation S304). For example, the host device 100A or 100B may determine whether the initialization process has been successfully performed, based on initialization process response information that is received from the memory card 200 through the card socket 11.

If it is determined that the initialization process has been successfully performed, the host device 100A or 100B determines the memory card 200 inserted in the card socket 11 as the memory card of the first type (operation S305).

However, if it is determined that the initialization process has been failed, the host device 100A or 100B supplies a power supply voltage to a power supply voltage port other than the target port PX from among ports disposed in the card socket 11 to power up a memory card of a second type (Operation S306). Accordingly, the power supply voltage applied to the power supply voltage port other than the target port PX of the card socket 11 is supplied to the memory card 200 inserted in the card socket 11.

After applying the power supply voltage to the power supply voltage port other than the target port PX to power up the memory card of the second type, the host device 100A or 100B performs an initialization process for the memory card 200 inserted in the card socket 11 according to an initialization standard corresponding to the memory card of the second type (Operation S307). That is, the host device 100A or 100B assumes the memory card 200 inserted in the card socket 11 as a memory card of a second type and then performs an initialization process.

The host device 100A or 100B determines whether the initialization process in Operation S307 has been successfully performed (Operation S308). For example, the host device 100A or 100B may determine whether the initialization process has been successfully performed, based on initialization process response information that is received from the memory card 200 through the card socket 11.

If it is determined that the initialization process has been successfully performed, the host device 100A or 100B determines the memory card 200 inserted in the card socket 11 as the memory card of the second type (operation S309).

However, if it is determined that the initialization process has been failed, the host device 100A or 100B generates a signal indicating a failure of the memory card identification process (Operation S310).

In the above exemplary embodiments, a memory card is identified by a method in which power-up and initialization processes corresponding to a memory card of a first type are first performed and then power-up and initialization processes corresponding to a memory card of a second type are additionally performed if the initialization process corresponding to the memory card of the first type fails.

In another exemplary embodiment, a memory card may be identified by a method in which power-up and initialization processes corresponding to a memory card of a second type are first performed and then power-up and initialization processes corresponding to a memory card of a first type are additionally performed if the initialization process corresponding to the memory card of the second type fails.

Figure 22:
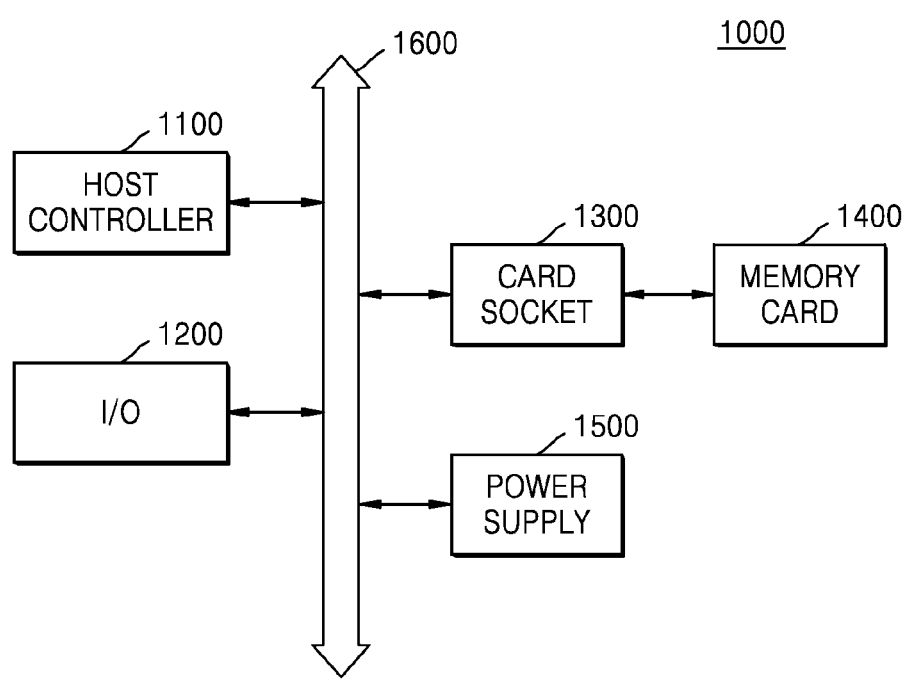
FIG. 22 is a block diagram of an electronic device including a memory card identification device according to an exemplary embodiment.

FIG. 22 is a block diagram of an electronic device 1000 including a memory card identification device according to an exemplary embodiment.

Referring to FIG. 22, the electronic device 1000 may include a host controller 1100, an input/output (I/O) device 1200, a card socket 1300, a memory card 1400, a power supply 1500, and a bus 1600.

The host controller 1100 may be the host controller 13A illustrated in FIG. 4A, and the card socket 1300 may be the card socket 11 illustrated in FIG. 1 or 4A. The memory card 1400 may be one of various memory cards illustrated in FIGS. 8 to 15.

Although not illustrated in FIG. 22, the electronic device 1000 may further include ports that may communicate with a video card, a sound card, a memory card, an USB device, and the like or communicate with other electronic devices. The electronic device 1000 may include a personal computer and a portable electronic device, such as a notebook computer, a mobile phone, a PDA, or a camera.

The host controller 1100 may perform certain calculations or tasks. According to an exemplary embodiment, the host controller 1100 may be a micro-processor or a central processing unit (CPU). The host controller 1100 may communicate with the I/O device 1200 and the memory card 1400 via the bus 1600 including an address bus, a control bus, and a data bus. According to an exemplary embodiment, the host controller 1100 may also be connected to an extended bus such as a peripheral component interconnect (PCI) bus.

The I/O device 1200 may include an input unit, such as a keyboard, a keypad, or a mouse, and an output unit, such as a printer or a display. The power supply 1500 may supply an operating voltage that is needed for an operation of the electronic device 1000.

Figure 23:
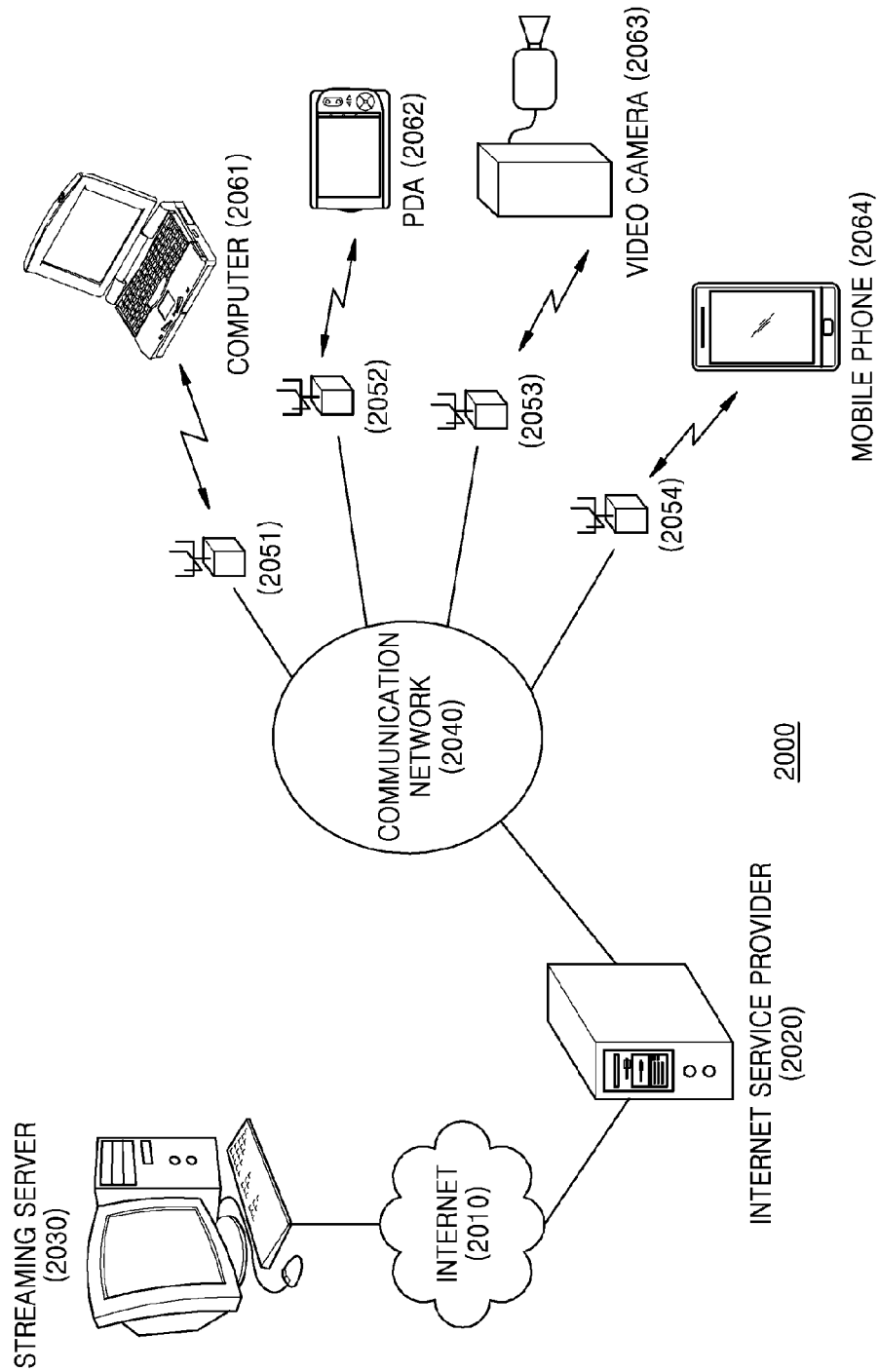
FIG. 23 is a block diagram of a contents transmission and reception system including a memory card identification device according to an exemplary embodiment.

FIG. 23 is a block diagram of a contents transmission and reception system 2000 including a memory card identification device according to an exemplary embodiment.

The contents transmission and reception system 2000 may include a plurality of devices, such as a computer 2061, a PDA 2062, a video camera 2063, and a mobile phone 2064, which are connected to Internet 2010 via an internet service provider 2020, a communication network 2040, and wireless base stations 2051 to 2054. A memory card identification device and a memory card according to an exemplary embodiment may be included in each of the plurality of devices of the contents transmission and reception system 2000. For example, each of the computer 2061, the PDA 2062, the video camera 2063, and the mobile phone 2064 may include the memory card identification device 10 of FIG. 1.

At least one of the components, elements or units represented by a block as illustrated in FIGS. 1-4B, 16 and 17 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a central processing unit (CPU) that performs the respective functions, a microprocessor, or the like. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

While one or more exemplary embodiments have been particularly shown and described above, it will be understood by those of ordinary skill in the art that various changes in form and details may be made therein without departing from the spirit and scope of the following claims. It should be understood that the exemplary embodiments described therein should be considered in a descriptive sense only and not for purposes of limitation.

What is claimed is:
1. A memory card identification device comprising:
a card socket comprising a single card slot through which at least two kinds of memory cards can be inserted and a target port disposed to be in contact with any one kind of a target memory card based on an external characteristic difference between the at least two kinds of memory cards; and
a card type detector configured to determine a type of a memory card inserted in the card socket by using a contact state signal of the target port,
wherein the target port is disposed in a position where the target port does not contact patterns disposed in a memory card other than the target memory card of the at least two kinds of memory cards.

2. The memory card identification device of claim 1, wherein the target port includes an electrical switch which is turned on or turned off according to an outer shape of a memory card inserted in the card socket.

3. The memory card identification device of claim 2, wherein the electrical switch in the target port is configured to generate a signal indicating a first logic state in response to insertion of the target memory in the card socket and generates a signal indicating a second logic state in response to insertion of a memory card other than the target memory in the card socket.

4. The memory card identification device of claim 1, wherein the target port is allocated as a port for supplying a power supply voltage of the target memory card.

5. The memory card identification device of claim 1, wherein the card type detector configured to determine the type of the memory card inserted in the card socket based on a turn-on state or turn-off state of an electrical switch formed in the target port.

6. The memory card identification device of claim 5, wherein the card type detector configured to determine the memory card inserted in the card socket as a first type in response to detection of a turn-on signal from the electrical switch, and to determine the memory card inserted in the card socket as a second type in response to detection of a turn-off signal from the electrical switch.

7. The memory card identification device of claim 1, wherein the card type detector is configured to determine the type of the memory card inserted in the card socket according to an initialization process using a first power supply voltage that is applied to the target port or an initialization process using a second power supply voltage that is applied to any one port other than the target port from among ports disposed in the card socket.

8. The memory card identification device of claim 1, wherein the card type detector is configured to determine the memory card inserted in the card socket as a first type in response to a determination that an initialization process corresponding to a card standard of the first type is successfully performed based on a first power supply voltage in a period in which the first power supply voltage is supplied to the target port.

9. The memory card identification device of claim 8, wherein, if the initialization process corresponding to the card standard of the first type fails, the card type detector is configured to determine the memory card inserted in the card socket as a second type in response to a determination that an initialization process corresponding to a card standard of the second type is successfully performed based on a second power supply voltage in a period in which the second power supply voltage is supplied to a port other than the target port from among ports disposed in the card socket.

10. The memory card identification device of claim 1, wherein the card socket further comprises a sensor configured to sense a state in which a memory card is inserted through the single card slot.

11. A host device comprising:
a card socket comprising a single card slot through which at least two kinds of memory cards can be inserted and a target port corresponding to any one kind of a target memory card that is disposed based on an external characteristic difference between different kinds of memory cards; and a host controller configured to determine a type of a memory card inserted in the card socket and to perform an initialization operation by using a state signal of the target port,
wherein the target port is allocated as a port for supplying a power supply voltage of the one kind of target memory card and is disposed in a position that does not overlap a position where ports corresponding to a memory card other than the target memory card from among the at least two kinds of memory cards are disposed.

12. The host device of claim 11, wherein the host controller performs a first initialization operation corresponding to a card standard of a first type after applying a first power supply voltage to the target port in a state in which a memory card is inserted in the card socket, and determines the memory card as the first type in response to a determination that the first initialization operation is successfully performed.

13. The host device of claim 12, wherein the host controller performs, if the first initialization operation fails, a second initialization operation corresponding to a card standard of a second type after applying a second power supply voltage to any one port other than the target port from among ports disposed in the card socket, and determines the memory card as the second type in response to a determination that the second initialization operation is successfully performed.

14. The host device of claim 11, wherein the card socket further comprises a sensor configured to sense a state in which a memory card is inserted in the card socket through the single card slot, and the host controller configured to determine whether a memory card is inserted in the card socket, based on a sensing signal generated by the sensor.

15. The host device of claim 11, wherein the target port includes an electrical switch which is turned on or turned off according to an outer shape of a memory card inserted in the card socket, and the host controller determines a type of the memory card inserted in the card socket based on a signal output from the electrical switch formed in the target port.

16. The host device of claim 15, wherein the host controller configured to store data in a memory card inserted in the card socket or read data from the memory card based on an interface standard corresponding to the determined memory card type.

17. A memory card that is applicable to a host device supporting different kinds of memory cards through a card socket including a single card slot, the memory card comprising:
a printed circuit board (PCB) configured to dispose a first set of contact patterns for at least one signal in a first zone and to dispose a contact pattern for a power supply voltage in a second zone; and
a memory device and a memory controller which are mounted on the PCB, the memory controller being configured to control the memory device based on a command and an address which are received from the host device through the contact patterns in the first and second zones,
wherein a position of the contact pattern for the power supply voltage in the second zone is determined so as not to overlap with a position of electrical contact patterns disposed in a legacy memory card other than the memory card of the different kinds of memory cards.

18. The host device of claim 17, wherein the contact pattern disposed in the second zone corresponds to a target port disposed in the card socket, and the target port is allocated as a port for supplying a power supply voltage of the memory controller of the memory cards.

* * * * *